(12) United States Patent
Deschamps et al.

(10) Patent No.: US 8,159,587 B2
(45) Date of Patent: Apr. 17, 2012

(54) PIXEL READ CIRCUITRY

(75) Inventors: Benoît Deschamps, Sassenage (FR); Frédéric Barbier, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 652 days.

(21) Appl. No.: 12/333,011

(22) Filed: Dec. 11, 2008

(65) Prior Publication Data
US 2009/0153715 A1  Jun. 18, 2009

(30) Foreign Application Priority Data

Dec. 13, 2007  (EP) ..................................... 07301675

(51) Int. Cl.
*H04N 5/335* (2011.01)
*H04M 1/00* (2006.01)
*H01L 31/0232* (2006.01)

(52) U.S. Cl. ........................................ 348/308; 257/72
(58) Field of Classification Search .................. 348/308, 348/300, E5.091, 297, 362; 455/556.1; 257/72
See application file for complete search history.

(56) References Cited

U.S. PATENT DOCUMENTS

| | | | | |
|---|---|---|---|---|
| 6,008,486 A * | 12/1999 | Stam et al. | ................. | 250/208.1 |
| 7,119,317 B2 * | 10/2006 | Ando et al. | ................. | 250/208.1 |
| 7,362,365 B1 * | 4/2008 | Reyneri et al. | ................. | 348/308 |
| 2005/0231619 A1 * | 10/2005 | Nakamura et al. | ............ | 348/303 |
| 2007/0097240 A1 | 5/2007 | Egawa et al. | | |
| 2008/0291310 A1 * | 11/2008 | Ladd et al. | ..................... | 348/308 |
| 2008/0291313 A1 * | 11/2008 | Krymski | ....................... | 348/308 |
| 2009/0190015 A1 * | 7/2009 | Bechtel et al. | ................ | 348/302 |

OTHER PUBLICATIONS

Egawa et al, A ¼.5 inch 5.2Mpixel 96dB Dynamic Range CMOS Image Sensor with Fixed Pattern Noise Free, Double Exposure Time Read-Out Operation, Nov. 13-15, 2006, IEEE Asian, Print ISBN: 0-7803-9734-7, pp. 135-138.*
European Search Report dated Jun. 17, 2008 from European Patent Application No. 07 30 1675.

* cited by examiner

*Primary Examiner* — David Ometz
*Assistant Examiner* — Fayez Bhuiyan
(74) *Attorney, Agent, or Firm* — Wolf, Greenfield & Sacks, P.C.

(57) ABSTRACT

A method of reading voltages from an image sensor having an array of pixels, each pixel Having at least one photodiode connectable to a storage node, the method including: controlling each pixel in a row of pixels to store and output a first voltage value at a first instance, a second voltage value at a second instance, and a third voltage value at a third instance, the first, second and third voltage values being representative of charge accumulated by the photodiodes during an integration phase; comparing the first voltage value from each pixel with a reference threshold; sampling for each pixel, based on the comparison, one of the second and third voltage values, and generating an output pixel value based on the sampled one of the second and third voltage values.

27 Claims, 4 Drawing Sheets

PIXEL READ CIRCUITRY

CROSS REFERENCE TO RELATED APPLICATIONS

This application claims the priority benefit of European patent application number 07301675.0, filed on Dec. 13, 2007, entitled "Pixel Read Circuitry," which is hereby incorporated by reference to the maximum extent allowable by law.

FIELD OF THE INVENTION

The present invention relates to an image sensor, and in particular to an image sensor comprising circuitry for reading the pixel voltage of pixels of the image sensor.

BACKGROUND OF THE INVENTION

FIG. 1 illustrates a pixel 100 of a CMOS image sensor, which is generally known in the art as a 2T5 pixel, as it comprises five transistors and two photodiodes. This circuitry is for example described in IEEE publication titled "A 1/2.5 inch 5.2 Mpixel, 96 dB Dynamic Range CMOS Image Sensor with fixed Pattern Noise Free, Double Exposure Time Read-Out Operation", Yoshitaka Egawa et al.

Circuit 100 comprises photodiodes 101 and 102, connected between ground and first source/drain nodes of respective transistors 104 and 106, which have their second source/drain nodes connected to a node 107. Node 107 is connected to the gate of a transistor 108, which has one of its source/drain nodes connected to a column line 110, and its other source/drain node connected to a supply voltage via a transistor 112. A reset transistor 114 is connected between node 107 and the supply voltage.

Photodiodes 101 and 102 are reverse polarized, and their electrical behavior is similar to that of capacitors, allowing a voltage to be stored by them, which is discharged during an integration phase of the image sensor. Charges accumulated are then transferred to the parasitic capacitance of node 107, and the resulting voltage of node 107 can be read via column line 110, by activating transistor 112.

The operation of pixel 100 for capturing and reading image data from photodiode 101 as described by Egawa et al. will now be described with reference to the timing diagrams illustrated in FIG. 2.

Before the start of the integration phase, the reset signal RST is applied to reset the voltage at node 107 to the supply voltage. Signal TG1 at the gate of transistor 104 is then asserted high for a first pulse 201, for example to a voltage of 2.8 V, such that transistor 104 is turned on and photodiode 101 discharges any charge stored by it to the supply via transistors 104 and 114. The internal photodiode potential becomes the natural potential of the photodiode that results from doping, for example equal to around 1.5 V. At the start of an integration phase, TG1 returns low, as shown by falling edge 202 in FIG. 2. The reset transistor 114 remains on.

During the integration phase, electrical charges generated in the photodiode 101 reduce the photodiode voltage. After a determined time period, TG1 is asserted high for a second pulse 203, but to a lower voltage than the first pulse 201. The first pulse has a magnitude of 2.8 V and the second pulse 1.4 V. If the photodiode voltage has fallen during this time to a value below $1.4-V_{thTG}$, where $V_{thTG}$ is the threshold voltage of transistor 104, it will be increased again to this level. Otherwise, if it is higher than $1.4-V_{thTG}$, it will remain at the corresponding level. Because the reset transistor is still open, node 107 remains at the supply voltage.

At the falling edge of the second pulse, labelled 204 in FIG. 2, a short integration period starts, in which the photodiode voltage continues to fall due to charge generated by exposure to light of the photodiode. The signal RST is then lowered to isolate node 107 from the supply voltage. The short integration phase is ended by a third pulse 205 applied to TG1 having the same low amplitude as the second pulse 203, for example 1.4 V. Thus, if during the short integration phase the photodiode voltage has fallen to less than $1.4-V_{thTG}$, the voltage at node 107 will decrease accordingly, and the photodiode voltage will be returned to $1.4-V_{thTG}$. The voltage at node 107 is then read, as indicated by arrow L1 in FIG. 2, by activating transistor 112, such that the voltage is output on column line 110. This first voltage is digitalized into a 16-bit value.

Next, the voltage at node 107 is reset by activating and then deactivating the reset transistor 114, and a fourth pulse 207 is applied to TG1 having a high amplitude of 2.8 V. The voltage at node 107 is then altered by the total charge accumulated by the photodiode. After the falling edge of the fourth pulses labelled 210 in FIG. 2, the voltage at node 107 is again read as indicated by arrow L2. Transistor 112 is activated and outputs the voltage at node 107 to column line 110. This voltage level is digitalized to generate a 16-bit value.

The two reads as described above are performed on each row of pixels of the image sensor, and are stored in memory. The memory required for this is therefore the memory that would normally store two rows of image data. If the reading at L1 is V1 and the reading at L2 is V2, the final output is then determined as the highest value between V1+V2 and $V1(T_L/T_S)$, where $T_L$ is the overall time duration of the long integration period and $T_S$ is the time duration of the short integration period, these values being illustrated in FIG. 2. White balance and color reconstruction are then performed, and then compression to generate a 12-bit value for each pixel.

The method proposed by Egawa et al. allows the dynamic range of the pixel to be increased. However, it is disadvantageous as it requires two digitalizations, which are complicated to perform, and also it requires a comparison to find the maximum of V1+V2 and $V2(T_L/T_S)$, which is demanding on memory and processing power. Furthermore, where a rolling shutter is used in which rows are read sequentially, the frame rate is also slow. This is a particular problem, as with increasing image sensor resolutions, high frame rates are needed in order to read the whole matrix in time.

There is a need for an improved image sensor which provides a high dynamic range and at the same time uses a simplified integration process allowing increased frame rate.

SUMMARY OF THE INVENTION

Embodiments of the present invention aim to at least partially address one or more needs in the art.

According to one aspect of the present invention, there is provided a method of reading voltages from an image sensor comprising an array of pixels, each pixel comprising at least one photodiode connectable to a storage node, the method comprising: controlling each pixel in a row of pixels to store and output a first voltage value at a first instance, a second voltage value at a second instance, and a third voltage value at a third instance, the first, second and third voltage values being representative of charge accumulated by said photodiodes during an integration phase; comparing the first voltage value from each pixel with a reference threshold; sampling for each pixel, based on said comparison, one of said second and third voltage values; and generating an output pixel value based on the sampled one of said second and third voltage values.

According to one embodiment of the present invention, the first instance is a determined time period after the start of said integration phase, said second instance is at the end of a first integration period, said second voltage value being representative of charge accumulated by said photodiode during said first integration period, and said third instance is at the end of a second integration period, said third voltage value representative of charge accumulated by said photodiode during said second integration period, said second integration period being longer than said first integration period.

According to another embodiment of the present invention, the step of controlling each pixel to output a first voltage value comprises applying a first voltage level to a gate node of a transistor in each pixel coupled between said photodiode and said storage node, said first voltage level being chosen such that charge accumulated above a first threshold is transferred to said storage node.

According to another embodiment of the present invention, selecting one of the second and third voltage values comprises selecting said second voltage value if said first voltage value indicates that charge accumulated by said photodiode was above said first threshold, and otherwise selecting said third voltage value, and wherein generating an output pixel value based on said third voltage value comprises digitalizing the difference between said third voltage value and a reference value, and generating an output pixel value based on said second voltage value comprises digitalizing the difference between said second voltage value and said reference value multiplied by $T_L/T_S$, where $T_L$ is the duration of the long integration period, and $T_S$ is the duration of the short integration period.

According to another embodiment of the present invention, the voltage at said storage node is reset between storage of said first and second voltage values, and is not reset between storage of said second and third voltage values.

According to another aspect of the present invention, there is provided an image sensor comprising: an array of pixels, each pixel comprising at least one photodiode and a first transistor associated with said photodiode controllable to connect said photodiode to a storage node in said pixel to store a voltage value representative of a voltage of said photodiode; row control circuitry arranged to control the first transistors in a row of said pixels to each store first, second and third voltage values representative of voltages of the photodiodes at respective first, second and third times instances during an integration phase of the photodiodes, and to output said first, second and third voltage values; and output circuitry arranged to sample said first voltage value and to compare said first voltage values for each pixel with a reference threshold, and to sample for each pixel, based on said comparison, one of said second and third voltage values for use in generating an output pixel value.

According to an embodiment of the present invention, the image sensor further comprises a memory connected to said output circuitry arranged to store a one-bit value associated with each pixel in a row of pixels indicating the result of said comparison.

According to another embodiment of the present invention, if said third voltage value is selected, said output circuitry is arranged to generate said output pixel value as the digitized value of the difference between said third voltage value and a reference value, and if said second voltage value is selected, said output circuitry is arranged to generate said output pixel value as the digitized value of the difference between said second voltage value and said reference value multiplied by a gain factor.

According to other aspects of the present invention, there is provided a digital camera and a mobile telephone comprising the above image sensor.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 3:
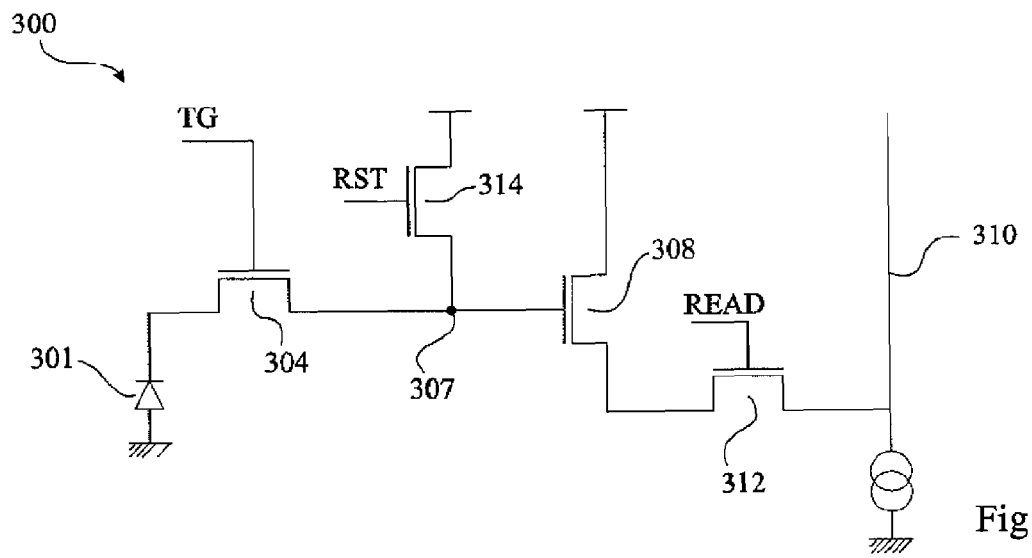
FIG. 3 illustrates a pixel structure used by embodiments of the present invention.

FIG. 3 illustrates a 4T pixel circuit comprising a photodiode 301, connected to a source/drain node of a transistor 304, which comprises a further source/drain node connected to a storage node 307. Node 307 is connected to the gate node of a transistor 308, which comprises a first source/drain node connected to a supply voltage, and a second source/drain node connected to a column line 310 via a read transistor 312. Read transistor 312 is controlled by a read signal READ. Node 307 is also connected to the supply voltage via a reset transistor 314, which is controlled by a reset signal RST.

Operation of pixel circuit 300 is very similar to that of pixel circuit 100 described above. In particular, as with photodiodes 101 and 102, photodiode 301 is reverse polarized and has an electrical behavior similar to that of a capacitor, allowing a voltage to be stored, which is discharged during an integration phase in which image data is captured by the image sensor. Charges accumulated are then transferred to the parasitic capacitance of node 307, and the voltage level at node 307 can be read via column line 310 by activating transistor 312.

Figure 1:
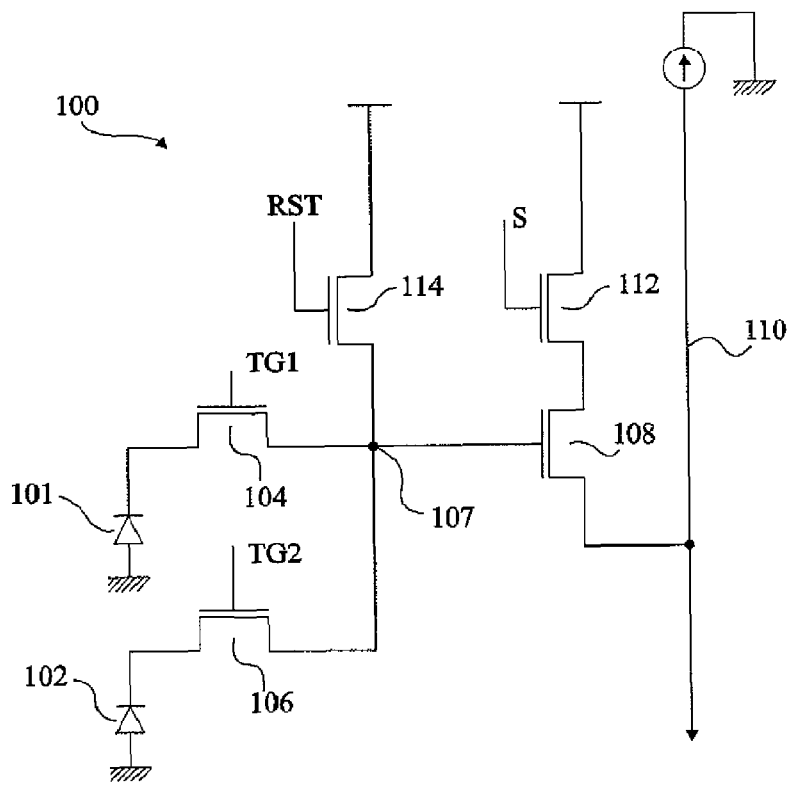
FIG. 1 (described above) illustrates a known pixel circuit.

A method for controlling and reading integration voltages from an image sensor comprising an array of the 4T pixel circuits 300 of FIG. 3 will now be described with reference to FIGS. 4, 5 and 6A to 6C. It will be apparent to those skilled in the art that the method may be applied to any pixel circuit having a transfer gate transistor, such as transistors 104 and 304, for transferring charge from the photodiode to a storage node, for example such as the 2T5 pixel circuit of FIG. 1, or a 1T75 pixel circuit.

Figure 4:
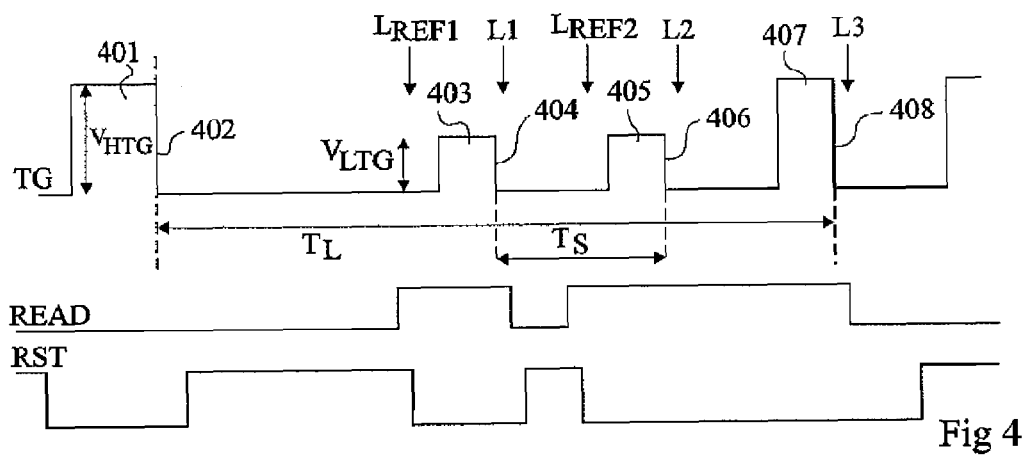
FIG. 4 shows timing diagrams of control signals applied to the circuit of FIG. 3 according to embodiments of the present invention.

FIG. 4 shows timing diagrams for the signal TG applied to the gate of transistor 304 in FIG. 3, signal READ applied to the gate of read transistor 312 and signal RST applied to the gate of the reset transistor 314. The waveform for signal TG is the same as that of signal TG1 described above in relation to FIG. 2, and the same reference numerals have been used, but with the first digit changed from a "2" to a "4". The signal TG comprises four pulses 401, 403, 405 and 407, the first and last pulses having a high amplitude $V_{HTG}$, for example equal to 3.6 V, and the second and third pulses having a low amplitude $V_{LTG}$ for example equal to 1 V.

Figure 2:
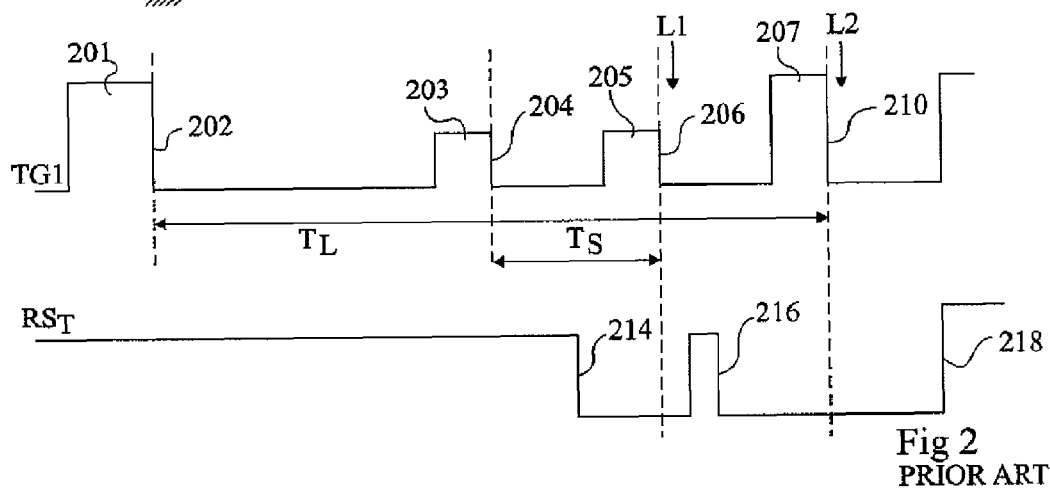
FIG. 2 (described above) shows timing diagrams of control signals applied to the pixel circuit of FIG. 1, according to a known method.

Whereas two reads L1 and L2 are performed in the method of FIG. 2, only one comparison at L1 shortly after the falling edge 404, and one read at L2 or L3 shortly after the falling edges 406 and 408 of the third and fourth pulses respectively are performed in the present method.

In a similar fashion to the method described in relation to FIG. 2, the first pulse 401 discharges the photodiode 301 to node 307, and the photodiode takes its natural potential, for example approximately 1.5 V.

Before the second pulse 403, READ is asserted, RST is brought low, isolating node 307 from the supply level, and a reference voltage $V_{REF1}$ of node 307 is read at $L_{REF1}$. The second pulse 403 is then applied to transistor 304, having the effect of increasing the photodiode voltage to a level $V_{LD}$ if it has fallen below $V_{LD}$, where VLD is equal to $V_{LTG}-V_{thTG}$, $V_{LTG}$ being the amplitude of the second pulse 403, and $V_{thTG}$ the threshold voltage of transistor 304. For example, with $V_{LTG}$ equal to 1 V, and $V_{thTG}$ equal to 0.5 V, $V_{LD}$ is 0.5 V. $V_{LTG}$ for example corresponds to the mid-value of the voltage swing in the photodiode 301.

The falling edge of the second pulse, labelled 404 in FIG. 4, then starts a short integration period $T_S$. Shortly afterwards, the first comparison at L1 is made based on the voltage at node 307. Whereas in the method of FIG. 2 the reset signal is asserted while the second pulse is applied to TG1, reset is not applied in the present method, allowing the voltage at node 307 to be read. This voltage indicates whether the photodiode voltage has dropped below $V_{LD}$ during the first part of the long integration period. The voltage is not digitized, but is compared with a threshold value to generate a 1-bit control signal, as will be described below.

RST is then asserted for a short period to reset the voltage at node 307 to the supply voltage. This helps to reduce fixed pixel noise. Once the reset signal is brought low again, READ is applied, a voltage reference $V_{REF2}$ is read at $L_{REF2}$, and the third and fourth pulses 405, 407 of TG are applied, at the end of the short and long integration periods respectively.

The voltage at node 307 is then read, either at the end of the short integration period, shortly after the falling edge 406 of pulse 405 (L2) or at the end of the long integration period, shortly after the falling edge 408 of pulse 407 (L3). The voltage read at L2 or L3 is used to generate the final output of the pixel, which is digitalized as a 12 or 16-bit value.

The decision of whether to perform the read at L2 or L3 is based on the voltage at L1, which will be referred to as $V_{L1}$. If $V_{L1}$ indicates that no skimming occurred during the second pulse 403 because the photodiode voltage had not fallen below $V_{LD}$, then the voltage at node 307 will have remained close to the reference voltage $V_{REF1}$. The time between falling edges 402 and 404 in FIG. 4 is chosen such that it no skimming occurs at the end of this period, it can be assumed that saturation of the photodiode will not occur during the long integration period, and therefore the voltage $V_{L3}$ read at L3 is used as the pixel output, and the output is for example equal to $V_{REF2}-V_{L3}$.

On the other hand, if skimming did occur because the photodiode voltage did fall below $V_{LD}$, then the voltage at node 307 at L1 will be less than $V_{REF1}$, and this indicates that saturation of the photodiode will occur within the long integration phase. In this case, the voltage $V_{L2}$ read at L2 is used to generate the pixel output. The output is for example calculated as $(V_{REF2}-V_{L2}).T_L/T_S$, where $T_L$ and $T_S$ are the durations of the long and short integration periods respectively.

Figure 5:
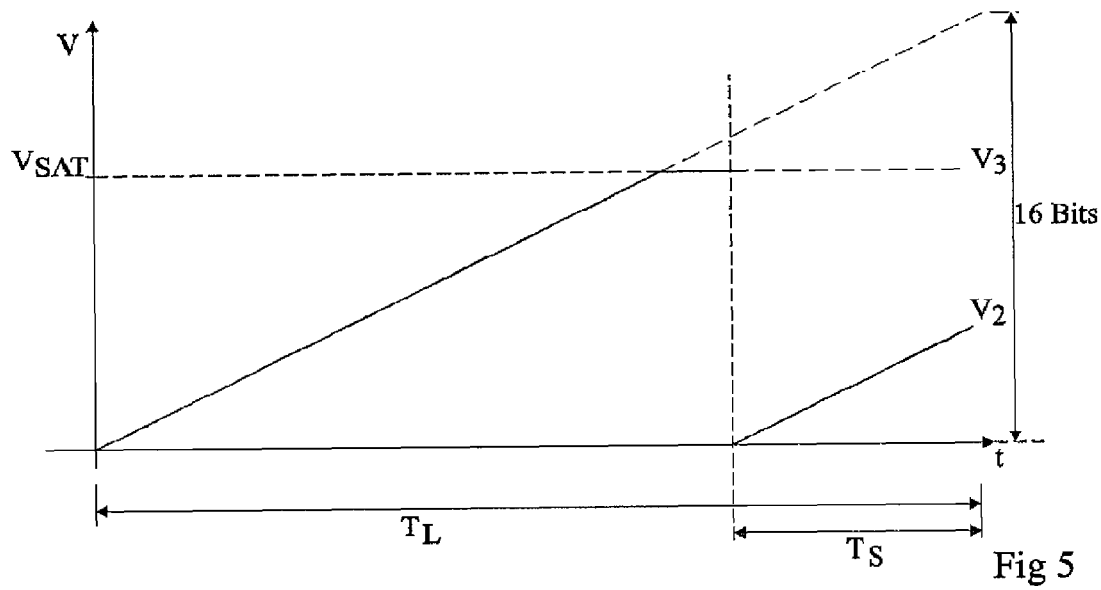
FIG. 5 is a graph illustrating the relationship between integration times and the voltages read during integration phases for generating a 16-bit image value.

FIG. 5 is a graph illustrating an example of the calculation of the output voltage based on voltages V3, which is equal to $V_{REF2}-V_{L3}$ and V2 which is equal to $V_{REF2}-V_{L2}$, assuming saturation occurs. A saturation voltage VSAT is reached by the photodiode voltage before the end of integration period $T_L$. The saturation voltage is determined by the full well of the photodiode, and is typically equal to the approximately $V_{RESET}-V_{SWING}$, where $V_{RESET}$ is the level of reset signal RST during reset, and $V_{SWING}$ is the voltage swing of the photodiode. Assuming $V_{RESET}$ equal to approximately 2.8 V, and $V_{SWING}$ 1 V, this give saturation at around 1.8 V. Thus V3 increases linearly until it reaches VSAT, and then it remains at VSAT until the end of the long integration period $T_L$. During the short integration period, V2 increases linearly to a level lower than VSAT. The pixel voltage can be assumed to be linearly increasing during integration, and thus V2 can be used to extrapolate the pixel voltage above the saturation point, based on the ratio between the length of the short and long integration periods.

Figure 6A:
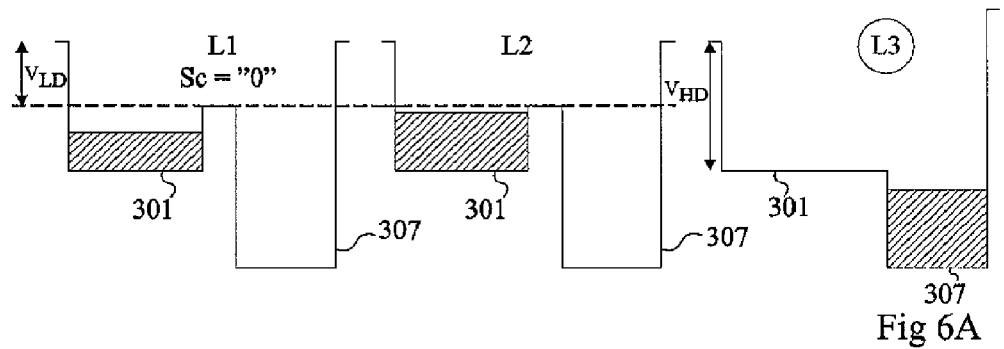
FIGS. 6A to 6C schematically illustrate charge transfer from a photodiode to a storage node of FIG. 3 according to an embodiment of the present invention.
Figure 6B:
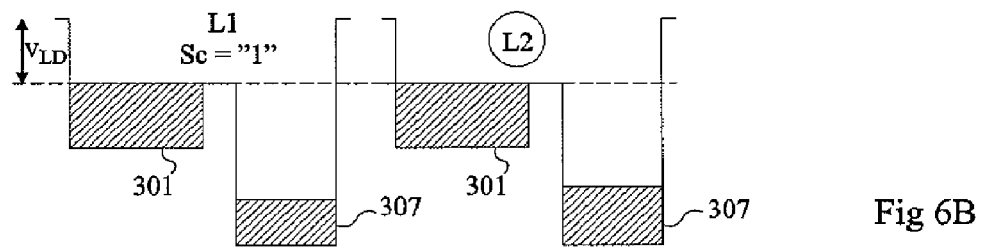
Figure 6C:
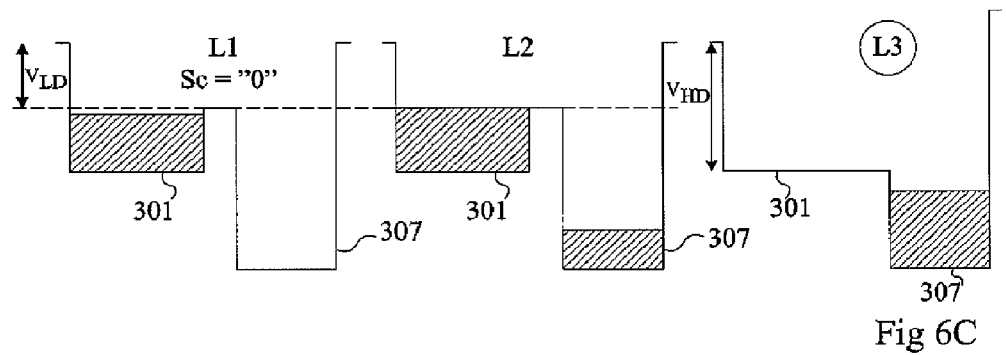

FIGS. 6A to 6C schematically represent charges accumulated by the photodiode 301 and stored by the storage node 307.

FIG. 6A illustrates the case in which V3 is used to generate the pixel output. In this case, at L1, no skimming of the photodiode voltage has occurred, and thus the control bit $S_C$ equals "0". Likewise, no skimming has occurred at L2, which is not read in this case.

FIG. 6B illustrates the case in which charge has been skimmed at L1, and thus the control bit $S_C$ equals "1", and V2 is used to calculate the pixel output.

FIG. 6C illustrates an intermediate case in which the charge accumulated at L1 is only just lower than the skimming threshold determined by $V_{LD}$, and at L2 charge is skimmed. The control bit $S_C$ is therefore equal to "0". Because no reset is performed between L2 and L3, at L3, the charge at node 307 will be equal to the charge transferred at L2 plus the charge transferred at L3, the addition being performed within the pixel in an analog fashion. V3 is used to generate the pixel output.

Figure 7:
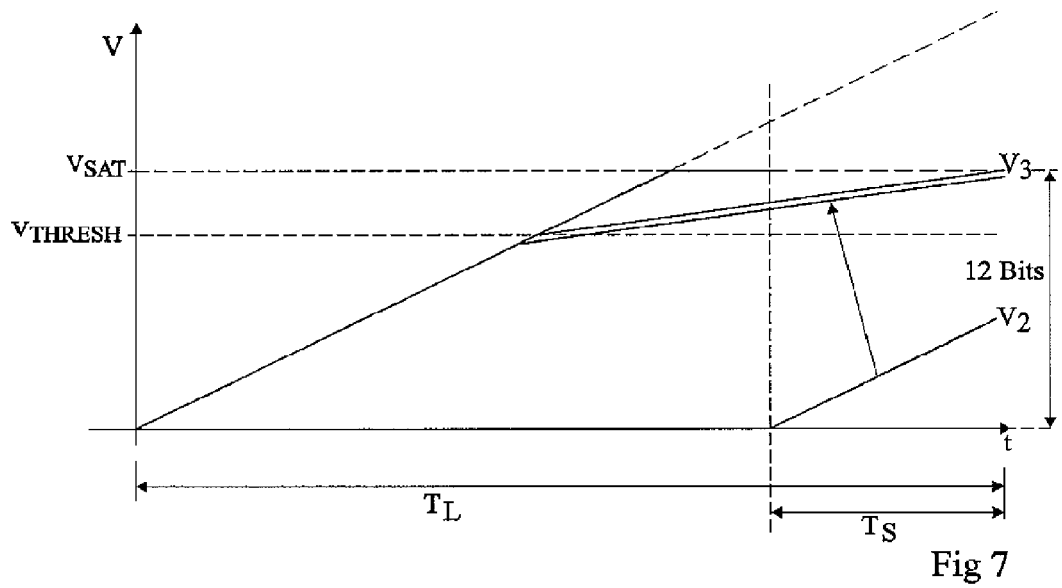
FIG. 7 is a graph illustrating the relationship between integration times and the voltages read during integration phases for generating a 12-bit image value.

FIG. 7 is a graph showing how the pixel output voltage can be determined based on the voltages V2 and V3 according to an alternative. If the output value is to be limited for example to 12 bits, a threshold voltage VTHRESH can be provided as a value lower than VSAT. Then, V3 is used as the pixel output if it is less than VTHRESH, but if it is greater than VTHRESH, the output is equal to:

Pixel output=i VTHRESH+V2

No gain is applied to V2 in this embodiment, and instead the gradient of the curve above VTHRESH is lower, due to the reduced integration time of V2 when compared to V3. Thus V2 is translated into a value on the double line shown in FIG. 7. This solution is particularly advantageous in the case of black and white images. For colour images, linearization could be applied before colour construction.

Figure 8B:
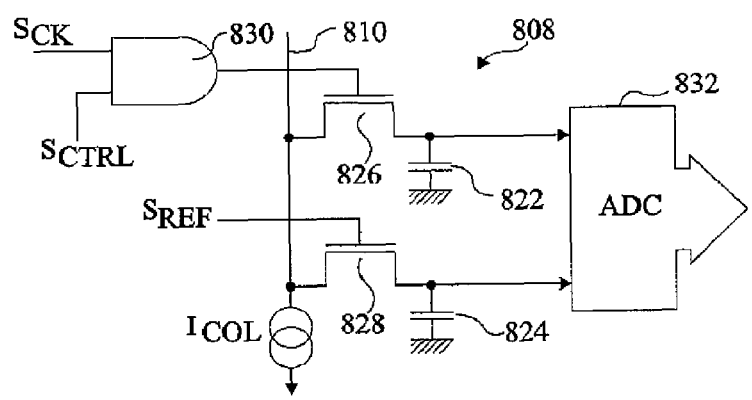
FIG. 8B schematically illustrates part of the sampling circuitry of FIG. 8A in more detail according to an embodiment of the present invention.
Figure 8A:
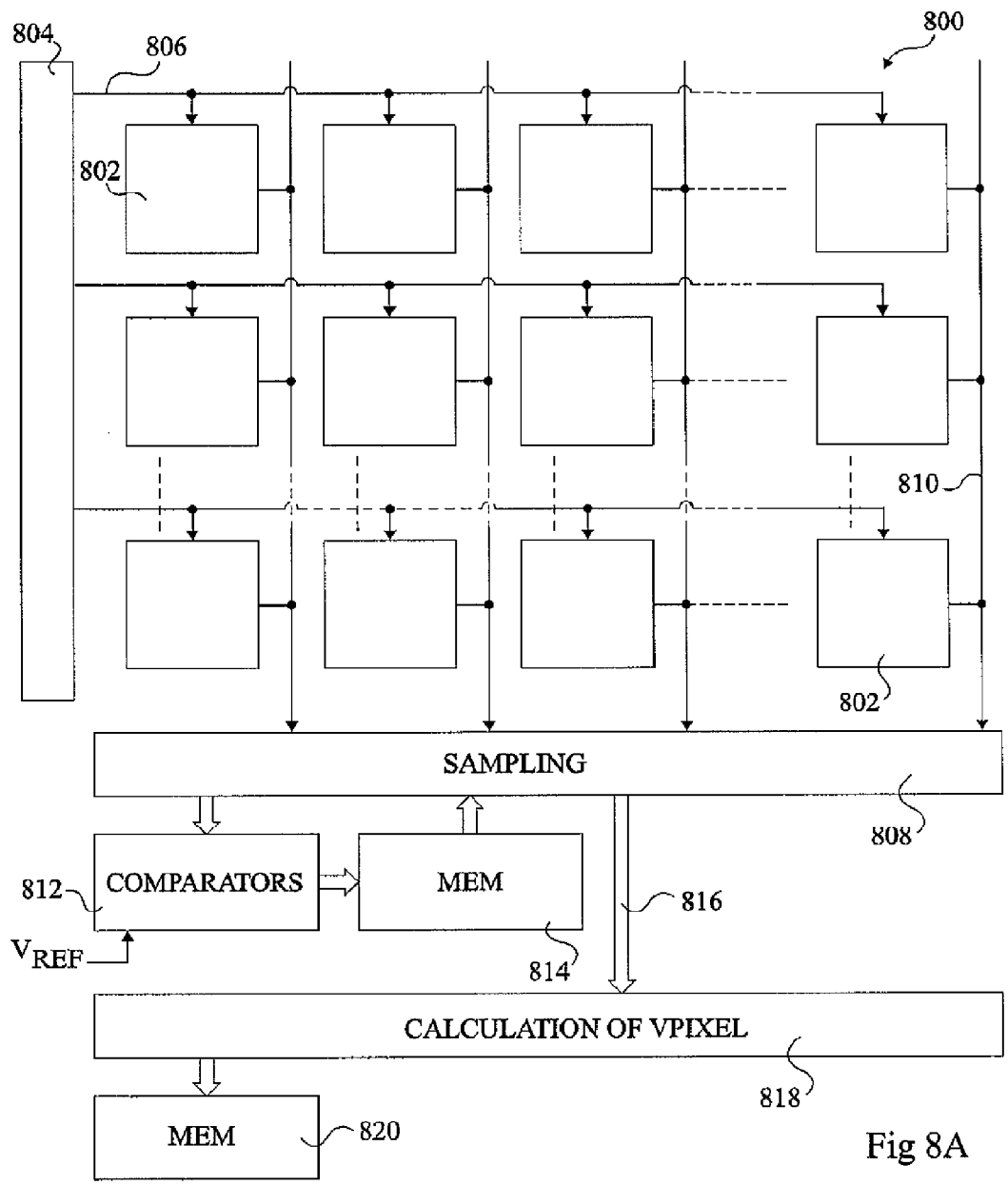
FIG. 8A illustrates schematically an image sensor comprising read circuitry according to an embodiment of the present invention.

FIG. 8A illustrates an image sensor 800 comprising an array of pixels 802, rows of the pixels being connected to row control circuitry 804, by row lines 806. Columns of pixels are connected to sampling circuitry 808, by column lines 810. An output of the sampling circuitry 808 is connected to a comparator block 812, which outputs values to a memory 814, accessible by the sampling circuitry. Sampled values are output on lines 816 to a pixel value calculation block 818, which is connected to a memory 820.

In operation, the row control circuitry 804 controls pixels 802, via row lines 806, with signals TG, RST and READ, to perform the integration phases as described above in relation to FIG. 4. The timing of each row is preferably staggered with respect to the next, to provide a rolling shutter, such that the voltages are output from one row at a time.

The sampling circuitry 808 samples $V_{REF1}$ at $L_{REF1}$ and $V_{L1}$ at L1 for a given row of pixels. The difference between these values are provided to comparator block 812, which comprises a series of comparators that compare each value with a threshold voltage. Based on this comparison, a 1-bit control value is stored in memory 814 associated with each pixel in the given row. The memory 814 controls the sampling circuitry 808 to sample each pixel in the row at either L2 or L3, based on the control bit associated with that pixel. The sampled values are adjusted to calculate the voltage change with respect to $V_{REF2}$, digitalized, for example into a 12 or 16 bit digital value, and provided as V2 or V3 to the pixel value calculation block 818. Block 818 generates a pixel value based on V2 or V3, and for example performs white balancing, colour construction and/or compression, and stores the data row by row in memory 820.

FIG. 8B illustrates part of the sampling block 808 of FIG. 8A in more detail. As illustrated, each column line 810 is connected to two capacitors 822, 824 via respective transistors 826, 828. Transistor 826 is controlled by the output of an AND gate 830, which receives a clock signal $S_{CLK}$ for timing L1, L2 and L3, and a control timing signal $S_{CTRL}$. Transistor 828 is controlled by a timing signal $S_{REF}$, which times $L_{REF1}$ and $L_{REF2}$.

In operation, $S_{CTRL}$ is initially high, and transistors 826 and 828 are controlled to sample and store $V_{L1}$ and $V_{REF1}$ on capacitors 822 and 824 respectively. These values are provided to the comparator block 812 of FIG. 8A to generate control bit $S_C$, and based on this bit, the control timing signal $S_{CTRL}$ is asserted high either during L2 or L3, such that either $V_{L2}$ or $V_{L3}$ is stored on capacitor 822, overwriting $V_{L1}$. $S_{REF}$ controls transistor 828 to store $V_{REF2}$ on capacitor 824. These values are then provided to an analog to digital converter 832 to generate the output voltage V2 or V3.

Figure 9:
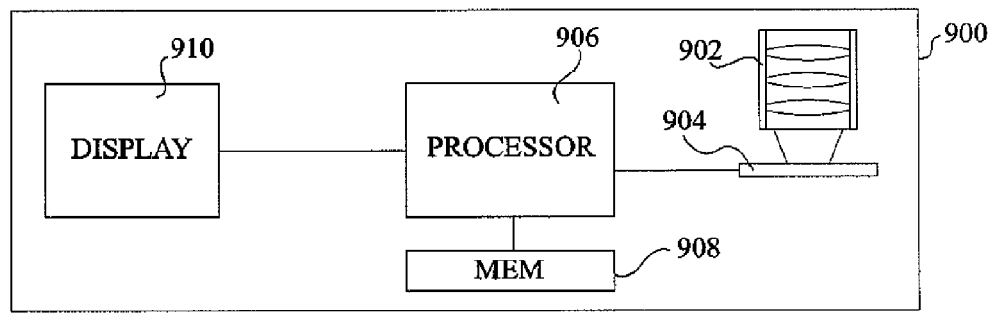
FIG. 9 illustrates an electronic device according to an embodiment of the present invention.

FIG. 9 illustrates an electronic device 900 comprising a lens unit 902, which receives an image, and an image sensor 904, for example comprising the image sensor 800 of FIG. 8. The image sensor 904 is connected to a processor 906, for example a DSP (digital signal processor). A memory 908 and a display 910 are connected to processor 906 for storing and displaying images respectively. The electronic device 900 is for example a digital camera, mobile telephone, PDA (personal digital assistant) or other image capturing device.

An advantage of embodiments of the present method is that only one read value is digitized for each pixel, and thus hardware resources in the image sensor can be reduced when compared to a circuit in which each read is digitalized.

A further advantage is that as only one read value is digitized, the processing time is reduced, allowing the frame rate of the image sensor to be increased.

Another advantage is that the sampling circuitry can be implemented with only two capacitors per column, as only one reference voltage and pixel voltage are stored at a time.

A further advantage is that the fixed pattern noise can be reduced when the full integration voltage is read, which provides improved quality.

Having thus described at least one illustrative embodiment of the invention, various alterations, modifications and improvements will readily occur to those skilled in the art.

For example, while circuits have been described comprising MOS transistors, some of these could be replaced by other types of transistors such as bipolar transistors. Furthermore, generation of the pixel values can be performed in hardware, software, or a combination of both. It will be apparent that while examples of the timing of control signals have been provided, many modifications can be made, while keeping the advantages of the invention.

What is claimed is:

1. A method of reading voltages from an image sensor having an array of pixels, each pixel comprising at least one photodiode connectable to a storage node, the method comprising:

controlling each pixel in a row of pixels to store and output a first voltage value at a first instance, a second voltage value at a second instance, and a third voltage value at a third instance, the first, second and third voltage values being representative of charge accumulated by said photodiodes during an integration phase;

comparing the first voltage value from each pixel with a reference threshold;

sampling for each pixel, based on said comparison, only one of said second and third voltage values; and generating an output pixel value based on only the sampled one of said second and third voltage values.

2. The method of claim 1, wherein the second instance is after the first instance, and the third instance is after the second instance.

3. The method of claim 1, wherein said first instance is a time period after the start of said integration phase, said second instance is at the end of a first integration period, said second voltage value being representative of charge accumulated by said photodiode during said first integration period, and said third instance is at the end of a second integration period, said third voltage value representative of charge accumulated by said photodiode during said second integration period, said second integration period being longer than said first integration period.

4. The method of claim 3, wherein said step of controlling each pixel to output a first voltage value comprises applying a first voltage level to a gate node of a transistor in each pixel coupled between said photodiode and said storage node, said first voltage level being chosen such that charge accumulated above a first threshold is transferred to said storage node.

5. The method of claim 4, wherein selecting one of the second and third voltage values comprises selecting said second voltage value if said first voltage value indicates that charge accumulated by said photodiode was above said first threshold, and otherwise selecting said third voltage value, and wherein generating an output pixel value based on said third voltage value comprises digitizing the difference between said third voltage value and a reference value, and generating an output pixel value based on said second voltage value comprises digitizing the difference between said second voltage value and said reference value multiplied by $T_L/T_S$, where $T_L$ is the duration of the long integration period, and $T_S$ is the duration of the short integration period.

6. The method of claim 1, wherein the voltage at said storage node is reset between storage of said first and second voltage values, and is not reset between storage of said second and third voltage values.

7. An image sensor comprising:
an array of pixels, each pixel comprising at least one photodiode and a first transistor associated with said photodiode controllable to connect said photodiode to a storage node in said pixel to store a voltage value representative of a voltage of said photodiode;
row control circuitry arranged to control the first transistors in a row of said pixels to each store first, second and third voltage values representative of voltages of the photodiodes at respective first, second and third instances during an integration phase of the photodiodes, and to output said first, second and third voltage values; and
output circuitry arranged to sample said first voltage value and to compare said first voltage values for each pixel with a reference threshold, and to sample for each pixel, based on said comparison, only one of said second and third voltage values for use in generating an output pixel value.

8. The image sensor of claim 7, further comprising a memory connected to said output circuitry arranged to store a one-bit value associated with each pixel in a row of pixels indicating the result of said comparison.

9. The image sensor of claim 7, wherein, if said third voltage value is selected, said output circuitry is arranged to generate said output pixel value as the digitalized value of the difference between said third voltage value and a reference value, and if said second voltage value is selected, said output circuitry is arranged to generate said output pixel value as the digitalized value of the difference between said second voltage value and said reference value multiplied by a gain factor.

10. A digital camera comprising the image sensor of claim 7.

11. A mobile telephone comprising the image sensor of claim 7.

12. A method of reading voltages from an image sensor having an array of pixels, each pixel comprising at least one photodiode connectable to a storage node, the method comprising:
outputting, for each pixel in a row of pixels, a first voltage value at a first time during an integration phase;
comparing the first voltage value for each pixel with a first reference value;
outputting, for each pixel in the row of pixels, a second voltage value at a second time during the integration phase and a third voltage value at a third time during the integration phase, the first, second and third voltage values representing charge accumulated by the photodiode during the integration phase;
selecting only one of the second and third voltage values based on a result of the comparison; and
generating, for each pixel in the row of pixels, an output pixel value, including digitizing the selected only one of the second and third voltage values.

13. A method as defined in claim 12, further comprising:
outputting, for each pixel in the row of pixels, the first reference value at a time before the first time.

14. A method as defined in claim 13, further comprising:
outputting a second reference value at a time between the first and second times.

15. A method as defined in claim 12, wherein comparing comprises generating a control bit to control the selecting of one of the second and third voltage values.

16. A method as defined in claim 12, wherein the second time is at the end of a first integration period, the second voltage value being representative of charge accumulated by the photodiode during the first integration period, and the third time is at the end of a second integration period, the third voltage value being representative of charge accumulated by the photodiode during the second integration period, the second integration period being longer than the first integration period.

17. A method as defined in claim 16, wherein outputting a first voltage value comprises applying a first voltage level to a gate of a transistor coupled between the photodiode and the storage node, the first voltage level being selected such that charge accumulated above a first threshold is transferred to the storage node.

18. A method as defined in claim 17, wherein selecting one of the second and third voltage values comprises selecting the second voltage value if the first voltage value indicates that the charge accumulated by the photodiode was above the first threshold, and otherwise selecting the third voltage value.

19. A method as defined in claim 18, wherein generating an output pixel value based on the third voltage value comprises digitizing a difference between the third voltage value and a second reference value, and wherein generating an output pixel value based on the second voltage value comprises digitizing a difference between the second voltage value and the second reference value multiplied by a ratio of the second integration period to the first integration period.

20. A method as defined in claim 12, wherein the voltage at the storage node is reset between outputting of the first and second voltage values, and is not reset between outputting of the second and third voltage values.

21. An image sensor comprising:
an array of pixels, each pixel comprising at least one photodiode and a first transistor;
row control circuitry configured to control the first transistors in a row of pixels to output a first voltage value at a first time, a second voltage value at a second time and a third voltage value at a third time, the first, second and third voltage values being representative of charge accumulated by the photodiode during an integration phase; and
output circuitry configured to compare the first voltage value for each pixel with a first reference value and to select only one of the second and third voltage values based on a result of the comparison, wherein only the selected one of the second and third voltage values is used to generate an output pixel value.

22. An image sensor as defined in claim 21, wherein the row control circuitry is further configured to output, for each pixel in the row of pixels, the first reference value at a time before the first time.

23. An image sensor as defined in claim 22, wherein the row control circuitry is further configured to output a second reference value at a time between the first and second times.

24. An image sensor as defined in claim 21, wherein the output circuitry is configured to generate a control bit to control selection of one of the second and third voltage values.

25. An image sensor as defined in claim 21, wherein the row control circuitry is configured to apply a first voltage level to a gate of a transistor coupled between the photodiode and a storage node, the first voltage level being selected such the charge accumulated above a first threshold is transferred to the storage node.

26. An image sensor as defined in claim 25, wherein the output circuitry is configured to select the second voltage value if the first voltage value indicates that the charge accumulated by the photodiode was above the first threshold, and otherwise to select the third voltage value.

27. An image sensor as defined in claim 26, wherein the output circuitry is configured to generate an output pixel value based on the third voltage value by digitizing a difference between the third voltage value and a second reference voltage, and to generate an output pixel value based on the second voltage value by digitizing a difference between the second voltage value and the second reference value multiplied by a ratio of a second integration period to a first integration period.

* * * * *